United States Patent [19]

Sepai

[11] Patent Number: 4,698,515

[45] Date of Patent: Oct. 6, 1987

[54] METHOD OF OPERATING RADIATION SENSORS

[75] Inventor: Dinyar Sepai, London, England

[73] Assignee: Crosfield Electronics (USA) Limited, London, England

[21] Appl. No.: 838,074

[22] Filed: Mar. 10, 1986

[30] Foreign Application Priority Data

Mar. 8, 1985 [GB] United Kingdom ............. 8506050

[51] Int. Cl.$^4$ .......................................... H04N 5/335
[52] U.S. Cl. ................................. 250/578; 358/212; 358/213.26; 358/282; 250/209
[58] Field of Search ............. 358/212, 213, 168, 171, 358/174, 280, 282, 293, 294; 250/578, 208-209

[56] References Cited

U.S. PATENT DOCUMENTS

| 4,216,503 | 8/1980 | Wiggins | 358/280 |
| 4,317,134 | 2/1982 | Woo et al. | 358/213 |
| 4,567,527 | 1/1986 | Yokomizo | 358/282 |

Primary Examiner—Edward P. Westin
Assistant Examiner—Charles Wieland
Attorney, Agent, or Firm—Sughrue, Mion, Zinn, Macpeak and Seas

[57] ABSTRACT

A method of operating a radiation sensor is described. The sensor has a plurality of radiation sensitive devices such as photodiodes, transfer buffers associated with the radiation sensitive devices, and at least one isolation buffer identical with the transfer buffers but not associated with a radiation sensitive device. The method comprises (a) exposing the radiation sensor to radiation, whereby each radiation sensitive device stores a charge related to the total radiation incident thereon, and simultaneously sequentially reading out the contents of the transfer and isolation buffers at a regular rate; (b) transferring the charge stored in the radiation sensitive devices into the corresponding transfer buffers; and, (c) while exposing the sensor under substantially the same conditions as in step (a), sequentially reading out the contents of the transfer and isolation buffers at the same regular rate.

8 Claims, 4 Drawing Figures

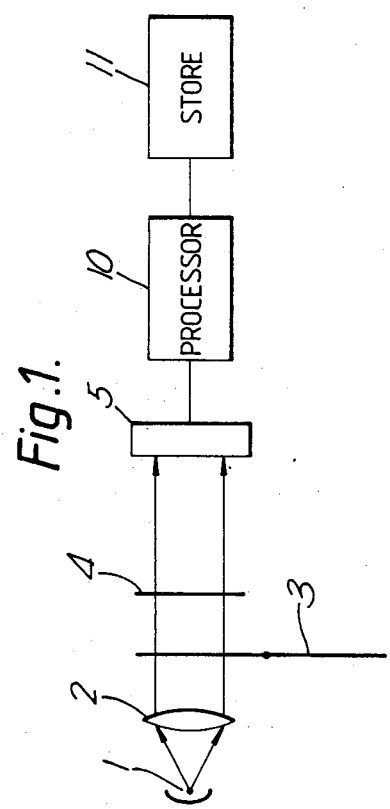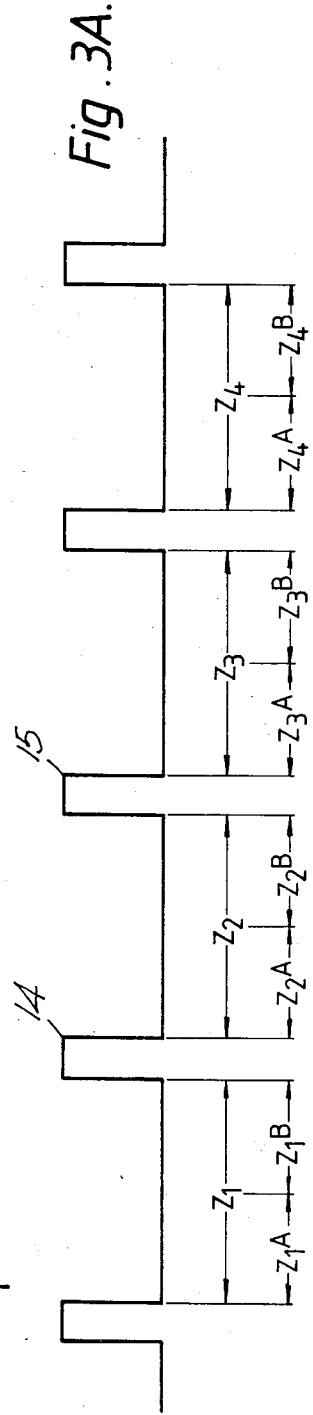

METHOD OF OPERATING RADIATION SENSORS

FIELD OF THE INVENTION

The invention relates to a method of operating a radiation sensor having a plurality of radiation sensitive devices and associated transfer buffers.

DESCRIPTION OF THE PRIOR ART

Radiation sensors having an array of radiation sensitive devices (photosites) are used in a variety of fields to monitor incident radiation, particularly light, The radiation sensitive devices integrate the incident radiation to develop a charge relation to the total radiation incident on the device which, in a transfer step, is transferred into the associated transfer buffers which are conveniently formed by charge coupled devices (CCDs). Typically, the transfer buffers are constituted by one or more shift registers. The contents of the shift register or shift registers are then shifted out to obtain information relating to the incident radiation. For optimum speed, while the array is being exposed, the contents of the shift register or registers from the preceding transfer are simultaneously shifted out.

These arrays have a particular application in the field of image scanning such as flat bed scanning. In this application, a transparency is positioned between a source of illumination and a linear array of radiation sensitive devices, relative movement being caused between the array and the transparency so that the transparency containing the image is scanned. It is becoming increasingly important to determine very accurately the amount of light incident on the light sensitive devices from the transparency. We have found that with commercial sensors aberrations are apparent particularly when scanning transparencies with high contrasts. This is manifested in a continuously variable level shift which appears to depend on the degree of illumination One attempt at dealing with this problem is described in GB-A-2126781. This method has proved successful but requires that the radiation sensor is periodically masked and in some applications the addition of a mask is difficult.

SUMMARY OF THE INVENTION

In accordance with the present invention, a method of operating a radiation sensor having a plurality of radiation sensitive devices, transfer buffers associated with the radiation sensitive devices, and at least one isolation buffer substantially identical with the transfer buffers but not associated with a radiation sensitive device comprises:

(a) exposing the radiation sensor to radiation, whereby each radiation sensitive device stores a charge related to the total radiation incident thereon, and simultaneously sequentially reading out the contents of the transfer and isolation buffers at a regular rate;

(b) transferring the charge stored in the radiation sensitive devices into the corresponding transfer buffers; and, (c) while exposing the sensor under substantially the same conditions as in step (a), sequentially reading out the contents of the transfer and isolation buffers at the same regular rate.

The most plausible explanation for the aberrations described above is "peripheral response". Peripheral response is a charge which builds up in the transfer buffers in response to the incident radiation. The invention overcomes the effect of peripheral response by reading out sequentially the contents of the transfer and isolation buffers twice at the same regular rate while transferring the accumulated charge stored in the radiation sensitive devices into the transfer buffers between the two read out steps.

During the first read out step (a) peripheral response as measured at the read out position will gradually increase. However, once the transfer buffers have been completely read out once, the peripheral response measured at the read out point will remain constant thereafter provided they are repeatedly read out. (It should be recognized that the transfer time of step (b) is negligible compared with the durations of steps (a) and (c). This enables the true information transferred from the radiation sensitive devices to be obtained since this will have been modified by the same, constant amount when it is read out.

Conventionally, the buffers are read out in the same order in step (c) as in step (b). However this is not essential provided that in both steps, each buffer is read out the same number of times as the others. Furthermore, in each of steps (a) and (c) the buffers could be read out more than once. This will depend on the relationship between the read out rate and the desired exposure time.

The contents of the transfer buffers read out in each step (c) may immediately be processed, or stored for subsequent processing, while the contents of the transfer buffers read out in step (a) should be ignored.

Preferably, the method further comprises a step (d) subsequent to step (c) of transferring the charge stored in the radiation sensitive devices during step (c) into the corresponding transfer buffers; and then repeating steps (a)-(c) while exposing the sensor under successivly different conditions.

The different conditions may include exposing the sensor to radiation of a different wavelength from the same position or to radiation of the same wavelength from a different position.

Typically, the radiation will comprise visible radiation.

The radiation sensitive devices may be arranged in one or two dimensional arrays.

The information read out in step (c) may be processed in a variety of ways but conveniently the method further comprises determining a peripheral response correction from information read out from the at least one isolation buffer; and modifying the information read out from the transfer buffers with the peripheral response correction.

The effect of the peripheral response is to add a charge to the charge transfer from the transfer buffers, and since in accordance with the invention this charge is constant, it constitutes a dc offset and it is a simple matter simply to subtract the offset (ie. the peripheral response correction) from the information read out from the transfer buffers.

This is particularly useful when using a conventional sensor such as the Fairchild CCD 151, which already includes a number of isolation buffers which are provided to separate the transfer buffers from dark reference cell buffers provided to enable compensation to be made for temperature effects and so-called dark current. The contents of the isolation buffers have previously been ignored. The invention is thus particularly suitable for use with conventional sensor arrays and does not require any physical changes to be made in the apparatus but instead a simple change in the processing of the read out information.

The invention should be contrasted with the conventional use of information from the dark reference buffers. The buffers are associated with respective photodiodes covered with aluminum. Charges accumulated by these photodiodes thus represent the effects of dark current and thermo-electric effects. The invention, however, enables an indication of peripheral response to be obtained without thermal effects. In other words, variations in the peripheral response due to temperature drift of the dark reference photodiode are removed.

It should also be noted that in steps (a) and (c) the radiation sensor is exposed under substantially the same conditions. This is important since we have discovered that the peripheral response differs if the exposure conditions change, for example there is a change in the wavelength (i.e. colour) of the incident light.

In view of the large number of radiation sensitive devices in conventional sensor arrays, it is generally necessary to provide the transfer buffers in two or more separate groups. Typically these groups of transfer buffers comprise shift registers which may be constituted by charged coupled devices. In this case, the peripheral response in each group may be different during the same exposure step, the effect of which is to give rise to dynamic register imbalance. Preferably, therefore, a peripheral response correction is determined from information in one or more isolation buffers from each group of transfer buffers, the information read out from the transfer buffers being modified in accordance with the corresponding peripheral response correction.

The invention is particularly applicable to image scanning in which a transparency is positioned between a light source and radiation sensor having a linear array of radiation sensitive devices, relative movement between the transparency and the sensor being carried out after each set of steps (a)–(d) whereby the transparency is scanned. Such scanning may be monochrome or colour scanning in a known manner.

The invention also has application in, for example, astronomy, where faint objects could be obscured by dc offsets, in high quality reproduction colour or monochrome for documentation or films and in monitoring application using television systems. The invention could also find application in telecine if films are required for retransmission, and of course in facsimile transmissions, particularly of colour.

BRIEF DESCRIPTION OF THE DRAWINGS

An example of image scanning apparatus for carrying out a method according to the invention will now be described with reference to the accompanying drawings, in which:

FIG. 1 is a schematic block diagram of the apparatus;

FIG. 2 is a schematic plan of the CCD array shown in FiG. 1; and,

FIGS. 3A and 3B are a pulse diagram and a graphical illustration of the dc offset respectively for one example of a method of operating a CCD array according to the invention.

DETAILED DESCRIPTION OF AN EMBODIMENT

The image scanning apparatus comprises a source of white light 1, and a converging lens 2 onto which light from the source is incident. A rotating filter disc 3 is positioned downstream of the lens 2 and light passing through the filter disc 3 is incident on a transparency 4. The transparency 4 is mounted in a conventional holder (not shown). Light from the transparency 4 impinges on a linear array 5 of photosites. This is a conventional flat bed scanning arrangement well known in the art and will not be described in detail.

The filter disc 3 may comprise three sectors arranged to transmit red, blue, and green light successively.

The array 5 comprises a plurality of photodiodes 6 (FIG. 2) arranged in a line. In practice, there may be at least 3500 photodiodes 6. Two shift registers 7, 8 (constituting respective sets of transfer buffers) are positioned on either side of the photodiodes 6 and alternate photodiodes are electrically connected to the shift registers 7, 8 respectively. The serial outputs of the shift registers 7, 8 are connected to multiplexer 9 which provides a multiplexed output corresponding to the contents of the photodiodes in sequence. An example of a suitable array 5 is the Fairchild CCD 151.

The multiplexed output from the array 5 is fed to a microprocessor 10 which selectively feeds the output, as described below, to a disc store 11.

It will be seen in FIG. 2 that the shift registers 7, 8 include a number of extra transfer buffers which are of two types 12, 13. The transfer buffers 12 are dark cells which are covered with an aluminum coating to provide an approximate indication of the dark level signal. These dark cells 12 are separated from the remainder of the transfer buffers by a number of isolation cells 13. For example, there may be five isolation cells 13 in each register 7, 8. In conventional CCD arrays, the purpose of the isolation cells 13 is simply to provide a buffer between the dark cells 12 and the remainder of the transfer buffers of the shift registers 7, 8.

In use, the filter disc 3 is rotated so that the transparency 4 is repeatedly illuminated by a series of red, green, and blue light. The light then impinges on the array 5 (including the shift registers 7,8). Since the photodiodes are arranged in a line, the transmission properties of a corresponding line of the transparency 4 will be determined.

FIG. 3A illustrates a typical sequence of operation. During a step $Z_1$ charge is accumulated in the photodiodes 6 and at the same time the contents of the shift registers 7, 8 are serially shifted out at a predetermined clock rate via the multiplexer 9 to the microprocessor 10. In this example, the read out rate is selected so that all the cells in the shift register 7, 8 including the dark cells 12 and isolation cells 13 are read out once during the period $Z_1$. This read out data is discarded. At the end of this period, the microprocessor 10 issues a transfer pulse 14 to transfer the charge accumulated in the photodiodes 6 into the shift registers 7,8. During the step $Z_1$ the transparency 4 is illuminated by for example red light and during the next step $Z_2$ it continues to be illuminated by red light. During this step $Z_2$ the shift registers 7, 8 are again read out at the same clock rate via the multiplexer 9 to the processor 10. It should be noted that the duration of the pulse 14 (about 500ns) is very small compared with $Z_1$ and $Z_2$. For example, a transport time of $2\mu s$ is typically required to read out two elements from the shift registers 7,8.

FIG. 3B illustrates the "dc offset" caused by the illumination of the shift registers 7, 8. In the FIG. 3B representation the effect of charges transferred from photodiodes 6 has been removed. Assuming that the shift registers 7, 8 are empty at the beginning of step $Z_1$ then if the signal output from the multiplexer 9 is monitored it will be found that this increases at a linear rate during the step $Z_1$ as indicated in FIG. 3B. This is because the charge output from the multiplexer 9 has come successively from further down the shift registers 7, 8, and has thus been exposed longer to the illuminating light. However, once all the cells have been read out once, if a further read out commences substantially immediately the dc offset will remain substantially constant at a value $O_1$. This corresponds to the maximum charge accumulated during the time taken to extract the charge stored in the dark cell 12 furthest from the multiplexer 9. At this stage, the charge accumulated in the photodiodes 6 is transferred in response to the transfer pulse 14 into the shift registers 7, 8. It should be understood that the duration of the transfer pulse 14 is very short and thus does not cause a significant change to occur in the peripheral response (dc offset). This transferred charge will be added to the charges already present in the shift registers 7, 8 which are at a constant lever $O_1$. During the step $Z_2$ these summated charges are read out via the multiplexer 9. (Other effects due for example to temperature are ignored in this discussion).

The isolation cells 13 do not have any charge transferred to them from the photodiodes 6 and thus contain a charge which is equal to the dc offset $O_1$. The microprocessor 10 thus determines the offset $O_1$ from the isolation cells 13 and subtracts this from the data read from the remainder of the shift registers 7, 8 to provide true output data which is fed to the disc store 11.

Further rotation of the filter wheel 3 causes the green filter to come between the converging lens 2 and the transparency 4 so that the transparency 4 is exposed to green light. This occurs at the time of a transfer pulse 15 which is followed by step $Z_3$ equivalent to the step $Z_1$. The data read out during the step $Z_3$, as with the data read out during the step $Z_1$, is discarded by the microprocessor 10.

It has been discovered that the peripheral response (or the dc offset) varies in accordance with the colour (or wavelength) of the illuminating radiation. This can be seen in FIG. 3B where the dc offset has fallen by the end of step $Z_3$ to a new value $O_2$. This value will be determined by the microprocessor 10 after the step $Z_4$ (equivalent to the step $Z_2$) from the contents of the isolation cells 13.

As has been mentioned above, in general there are a number of isolation cells 13 in each shift register 7,8. The value of the dc offset could therefore be determined by averaging the contents of the isolation cells 13 or by choosing to select the contents of one of the isolation cells 13 which is positioned centrally relatively to the other isolation cells. This latter procedure is generally preferable because the aluminium deposited over the dark cells 12 tends to cover at least part of the adjacent isolation cells 13.

After the step $Z_4$ further rotation of the filter disc 3 occurs at the same time as a transfer pulse (equivalent to the transfer pulse 15) to bring the blue filter into alignment with the lens 2 and transparency 4. Steps $Z_1$, $Z_2$ are then repeated for blue light. After this latest $Z_2$, a further transfer pulse (equivalent to the transfer pulse 15) is issued and at the same time the transparency 4 is shifted by for example a stepper motor to bring a new line of pixels of the image carried by the transparency into alignment with the CCD array 5.

The peripheral responses of the shift registers 7 and 8 can be different during the same illumination period. This can occur, for example, where there is high contrast in the image. This can mean that the shift registers 7, 8 are illuminated by light with significantly different intensities thus causing the generation of different peripheral responses in each shift register. To compensate for this, the microprocessor 10 monitors the charge in the isolation cells 13 from each shift register 7, 8 separately to determine individual peripheral response correction factors which are applied separately to the data read out from the corresponding shift registers.

In a modified example, each of the steps $Z_1$, $Z_2$ etc. is divided into two (preferably equal duration) subsidiary steps $Z_1{}^A$, $Z_1{}^B$. In each of these subsidiary steps the contents of the shift registers are fully read out but it is important to note that the read out rate of the step $Z_1{}^B$ is the same as that of $Z_2{}^A$ to ensure that the peripheral response remains constant when real data is being read out.

As an alternative to the filter disc system described, the method can be carried in a frame sequential colour scanning system.

I claim:

1. A method of operating a radiation sensor having a plurality of radiation sensitive devices (6), a plurality of transfer buffers (7,8) associated with said radiation sensitive devices, and at least one isolation buffer (13) substantially identical with said transfer buffers but not associated with a radiation sensitive device, the method comprising the steps of:
   (a) exposing said radiation sensor to radiation, whereby each radiation sensitive device stores a charge related to the total radiation incident thereon, and simultaneously sequentially reading out the contents of said transfer and isolation buffers at a regular rate;
   (b) transferring said charge stored in said radiation sensitive devices into said corresponding transfer buffers; and,
   (c) while exposing said sensor under substantially the same conditions as in step (a), sequentially reading out the contents of said transfer and isolation buffers at said same regular rate, and deriving a peripheral response correction factor from said contents of said at least one isolation buffer.

2. A method according to claim 1, further comprising a step (d) subsequent to said step (c) of transferring said charge stored in said radiation sensitive devices during step (c) into said corresponding transfer buffers; and then repeating said steps (a)–(c) while exposing said sensor under successively different conditions.

3. A method according to claim 1, wherein said contents of the transfer and isolation buffers are read out once in each of said steps (a) and (c).

4. A method according to claim 1, further comprising modifying the information read out from said transfer buffers with said peripheral response correction factor.

5. A method according to claim 4, wherein said transfer buffers are provided in two or more groups each associated with respective isolation buffers, the method comprising determining a peripheral response correction factor for each said group of transfer buffers from information in respective isolation buffers, and modifying the information read out from said transfer buffers in accordance with the corresponding peripheral response correction factor.

6. A method according to claim 1, wherein said radiation sensitive devices are arranged in a linear array.

7. A method according to claim 1, wherein said transfer and isolation buffers are arranged in at least one shift register of charge coupled devices, each shift register having at least one isolation buffer.

8. A method of scanning an image comprising the steps of: exposing said image to monochromatic light; causing light transmitted from said image to impinge on a radiation sensor having a plurality of radiation sensitive devices (6), transfer buffers (7,8) associated with said radiation sensitive devices, and at least one isolation buffer (13) substantially identical with the transfer buffers but not associated with a radiation sensitive device; causing stepwise relative movement between said image and said sensor; and after each stepwise movement:

(a) exposing said radiation sensor to radiation, whereby each radiation sensitive device stores a charge related to the total radiation incident thereon, and simultaneously sequentially reading out the contents of said transfer and isolation buffers at a regular rate;

(b) transferring said charge stored in said radiation sensitive devices into said corresponding transfer buffers;

(c) while exposing said sensor under substantially the same conditions as in step (a), sequentially reading out the contents of said transfer and isolation buffers at said same regular rate and deriving a peripheral response correction factor from said contents of said at least one isolation buffer;

(d) transferring said charge stored in said radiation sensitive devices during step (c) into said corresponding transfer buffers;

and then repeating said steps (a)-(c) while exposing said sensor under successively different conditions.

* * * * *